United States Patent
Cole et al.

(10) Patent No.: US 7,599,288 B2
(45) Date of Patent: Oct. 6, 2009

(54) PROCESSING OF USAGE DATA FOR FIRST AND SECOND TYPES OF USAGE-BASED FUNCTIONS

(75) Inventors: Raymond E. Cole, Fort Collins, CO (US); Scott Putnam Lamons, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 10/955,628

(22) Filed: Sep. 30, 2004

(65) Prior Publication Data

US 2006/0067493 A1 Mar. 30, 2006

(51) Int. Cl.
*G01R 31/08* (2006.01)
*G06F 11/00* (2006.01)
*G08F 15/00* (2006.01)

(52) U.S. Cl. .................. 370/230; 370/235; 379/112.06; 379/114.01; 379/126

(58) Field of Classification Search ............ 379/112.01, 379/112.02, 112.06, 112.07, 112.08, 114.01, 379/121.01, 126, 133, 137–139; 370/351–356
See application file for complete search history.

(56) References Cited

U.S. PATENT DOCUMENTS

| | | | |
|---|---|---|---|
| 5,247,575 A * | 9/1993 | Sprague et al. | 705/53 |
| 6,104,712 A * | 8/2000 | Robert et al. | 370/389 |
| 6,141,690 A * | 10/2000 | Weiman | 709/228 |
| 6,298,123 B1 | 10/2001 | Nolting et al. | |
| 6,349,289 B1 | 2/2002 | Peterson et al. | |
| 6,405,251 B1 | 6/2002 | Bullard et al. | |
| 6,418,467 B1 | 7/2002 | Schweitzer et al. | |
| 6,446,200 B1 | 9/2002 | Ball et al. | |
| 6,470,386 B1 | 10/2002 | Combar et al. | |
| 6,515,968 B1 | 2/2003 | Combar et al. | |
| 6,851,008 B2 * | 2/2005 | Hao | 710/305 |
| 2001/0012345 A1 * | 8/2001 | Nolting et al. | 379/112.01 |
| 2001/0019605 A1 * | 9/2001 | Rojas | 379/114.03 |
| 2001/0028706 A1 * | 10/2001 | Nolting | 379/134 |

(Continued)

FOREIGN PATENT DOCUMENTS

EP 1146687 10/2001

OTHER PUBLICATIONS

"HP and Cisco Deliver Internet Usage Platform and Billing and Analysis Solutions", News Releases, http://www.cisco.com/warp/pulbic/146/pressroom/1998/apr98/28.html, Apr. 28, 1998, Copyright 1998 Cisco Systems, Inc. 2 pgs.

(Continued)

*Primary Examiner*—Binh K Tieu

(57) ABSTRACT

Embodiments for monitoring a network are provided. In one embodiment, a method is provided. The method includes collecting data containing information on usage of a network by subscribers. The method further aggregates the data for a first type of usage-based function. Further, the method, simultaneously with the aggregating of the data, samples the data for a second, different type of usage-based function. In other embodiments, systems and machine readable media for monitoring usage of a network are also provided that provide simultaneous generation of data sets for first and second usage-based functions.

17 Claims, 2 Drawing Sheets

U.S. PATENT DOCUMENTS

| | | | |
|---|---|---|---|
| 2003/0028631 A1 | 2/2003 | Rhodes | |
| 2003/0033253 A1 | 2/2003 | Rhodes | |
| 2003/0033403 A1 | 2/2003 | Rhodes | |
| 2003/0105855 A1 | 6/2003 | Wynnyk | |
| 2003/0110252 A1 | 6/2003 | Yang-Huffman | |
| 2003/0115316 A1 | 6/2003 | Yang-Huffman | |
| 2003/0172220 A1* | 9/2003 | Hao | 710/305 |
| 2003/0185363 A1* | 10/2003 | Cerami et al. | 379/126 |
| 2004/0039809 A1 | 2/2004 | Ranous et al. | |
| 2004/0073533 A1 | 4/2004 | Mynarski et al. | |
| 2005/0105469 A1* | 5/2005 | Hao | 370/235 |
| 2006/0140368 A1* | 6/2006 | Mark et al. | 379/114.03 |

OTHER PUBLICATIONS

Jean Nattkemper, "HP and Cisco Deliver Internet Usage and Billing Solutions", http://www.interex.org/hpworldnews/hpw806/inet/02inet.html, Copyright 2001 Interex, 4 pgs.

Pasha Quadri et al., "White Paper: Internet Usage Platform", by Cisco Systems and Hewlett-Packard, http://www.dtr.com.br/cdrom/cc/corp/mkt/ga/hp/iup/ipuse_wp.htm, Copyright 1989-1998 Cisco Systems, Inc., 7 pages.

"NetFlow FlowCollector Installation and User Guide", Release 3.0, Copyright 1996-1999, Cisco Systems, Inc., 128 pages.

"P-Cube® Insight: Advanced Usage Collection", P-Cube, Insight 2.0 Datasheet1999-2003 P-Cube Inc., 2 pgs.

"Insight P-Cube's Network Usage and Analysis Solution", http://www.p-cube.com/products/insight/shtml, 3 pgs, Jul. 2, 2004.

* cited by examiner

PROCESSING OF USAGE DATA FOR FIRST AND SECOND TYPES OF USAGE-BASED FUNCTIONS

BACKGROUND INFORMATION

For a variety of reasons, Internet service providers are moving from current, fixed-rate, all-you-can-use Internet access billing plans to more complex billing plans. These new plans charge by metrics, such as volume of data transferred, bandwidth utilized, service used, time-of-day, and subscriber class. An example of such a rate structure might include a fixed monthly rate portion, a usage allocation to be included as part of the fixed monthly rate (a threshold), plus a variable rate portion for usage beyond the allocation (or threshold). For a given service provider there will be many such rate structures for the many possible combinations of services and subscriber classes.

Many systems have been developed to enable service providers to measure usage of their networks by subscribers. These systems must precisely measure the subscriber's use of the service provider's network to enable accurate billing. The billing data that is generated in this process may be voluminous. However, since the data is used to prepare bills for prompt payment, the billing data does not need to be stored for a long period of time. Rather, typically, the data is stored for a period of no more than several months. This need can be met with relatively small data storage capacity in the service provider's system.

Network usage analysis is another emerging field that monitors usage patterns of subscribers to assist service providers in meeting their subscribers' needs. Systems for network analysis provide information about how a service provider's services are being used and by whom. This is vital business information that a service provider can use to identify fast-moving trends, to establish competitive prices, and to define new services or subscriber classes as needed.

Many systems have been developed to extract these trends for service providers based on raw usage data. These systems typically focus on statistical analysis of usage data for the subscribers on a service provider's network. Thus, to accurately identify trends, these systems typically draw on data that covers a longer period of time compared to the data used for billing functions. This data is also typically maintained for longer periods of time than required for billing purposes. This need for accurate identification of trends in subscriber usage, thus, leads to service providers warehousing large volumes of usage data for long periods of time.

Usage-based billing and network analysis systems begin with the same raw usage data. However, due to differences in function, the data is handled in dramatically different ways. Service providers that implement both usage-based billing and network analysis conventionally store large quantities of data for long periods of time thus requiring extensive data storage systems. This can be a very expensive undertaking for network service providers.

SUMMARY

Therefore, there is a need in the art for systems and methods for processing raw usage data for use in implementing both usage-based billing and network analysis with reduced storage capacity requirements.

In one embodiment, a method for monitoring a network is provided. The method includes collecting data containing information on usage of a network by subscribers. The method further aggregates the data for a first type of usage-based function. Further, the method, simultaneously with the aggregating of the data, samples the data for a second, different type of usage-based function.

In another embodiment, a usage monitoring system is provided. The system includes a usage collector that collects usage records from a network. The system also includes a first usage processor, responsive to the usage collector, that aggregates data in the collected usage records to form a first set of data for a first type of usage-based function. The system further includes a second usage processor, responsive to the usage collector, that samples the usage records simultaneously with the first usage processor to form a second, reduced set of data for a second type of usage-based function.

In another embodiment, a system for monitoring usage of a network is provided. The system includes a first usage processor that aggregates data in records of usage of a network by subscribers for a first type of usage-based function. The system further includes a second usage processor that selects samples of the records for a second type of usage-based function. The first usage processor aggregates the data simultaneously with the second usage processor selecting samples of the records.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
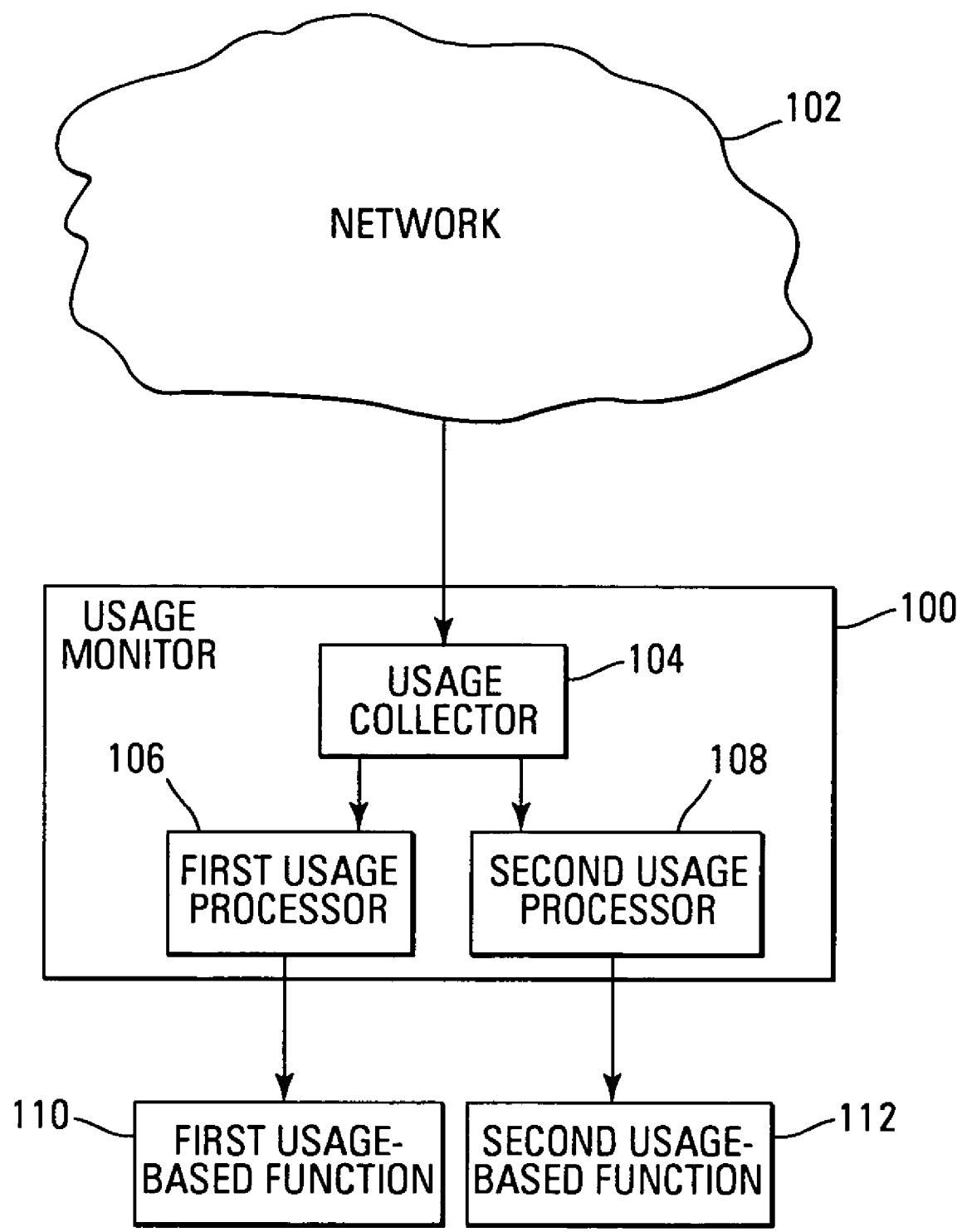
FIG. 1 is a block diagram of one embodiment of a usage monitor for a network.

FIG. 1 is a block diagram of one embodiment of a usage monitor, indicated generally at 100, for a network 102. In one embodiment, network 102 comprises a service provider network. For purposes of this specification, a service provider network is a network that carries traffic, e.g., data, voice or video, to and from subscribers. In one embodiment, the network 102 comprises an access network that provides access to the Internet or another network. In other embodiments, the network comprises one or more of a wired network and a wireless network. In other embodiments, the network 102 comprises, by way of example and not by way of limitation, a cable network, a telephony network, the Internet, an Internet Protocol (IP)-based network, or any other appropriate communication network that carries traffic to and from subscribers.

Usage monitor 100 is configured to monitor usage of the network 102 to enable the service provider to perform two different types of functions based on the same usage data provided by the network 102. In one embodiment, usage monitor 100 is configured to enable the service provider to implement both usage-based billing and network analysis using the same data provided by the network 102.

Network 102 provides messages to usage monitor 100 regarding each use of the network 102 to carry traffic to or from a subscriber. In one embodiment, the messages comprise usage records from network elements in network 102. For example, in one embodiment, the messages comprise usage records from routers, switches, transmitters, receivers, data logs, management terminals, etc. in the network. In other embodiments, the messages comprise messages from routers that contain information regarding each flow of traffic through the network. For purposes of this specification, a flow of traffic is a unidirectional stream of packets between given source and destination end points through network 102.

Usage monitor 100 collects and processes the usage messages from network 102. Usage monitor 100 includes usage collector 104. Usage collector 104 receives the messages from network 102 with the information on the usage of network 102. Usage collector 104 provides this information to first and second usage processors 106 and 108 such that each of usage processors 106 and 108 receive a complete set of the collected messages from network 102. In one embodiment, first usage processor 106 and second usage processor 108 are separate processors. In other embodiments, first usage processor 106 and second usage processor 108 are implemented on the same processor. In yet further embodiments, one or more of first usage processor 106 and second usage processor 108 are implemented in a bank of multiple processors.

First usage processor 106 aggregates data in the usage messages from network 102. First usage processor 106 provides the aggregated data to first usage-based function 110 for further processing. In one embodiment, first usage-based function 110 is a usage-based billing function.

Second usage processor 108 selectively retains a subset of the usage messages received from network 102. For purposes of this specification, the term "sample" means a finite part of a statistical population whose properties are studied to gain information about the whole. The samples are provided to second usage-based function 112. In one embodiment, second usage-based function 112 is a network analyzer function that is used to assist the service provider in planning modifications to its network or service offerings by identifying trends in network use, etc.

Second usage processor 108 processes the data from usage collector 104 substantially simultaneously with the processing of the data by first usage processor 106. For purposes of this specification, the term "simultaneous" means occurring at, substantially at, or close to the same time. First usage processor 106 creates a set of data that is an aggregation of the usage data and is suitable for use by a first type of usage-based function such as a billing function. Second usage processor 108 selectively retains a second, reduced set of data that is based on samples of the usage data and is suitable for use by a second, different type of usage-based function such as a network analysis function. By creating two sets of data substantially simultaneously, usage monitor 100 reduces the storage requirements for the service provider. The larger, aggregate data set generated by first usage processor 106 is maintained for a shorter period of time, e.g., a few months for billing purposes, and the smaller, reduced data set produced by the second usage processor 108 is maintained for a longer period of time to allow for network analysis. Thus, only the reduced set of data is maintained for a longer period of time thereby reducing the data storage requirements for the service provider.

In operation, usage monitor 100 processes messages relating to usage of network 102 for first and second usage-based functions 110 and 112. When data passes through network 102, a usage message is created and provided to usage monitor 100. This message is collected in usage collector 104. The data collected in usage collector 104 is further processed by first and second usage processors 106 and 108. In one embodiment, first usage processor 106 aggregates the usage information in usage collector 104 to create a first set of data for a usage-based billing function 110. Second usage processor 108 samples the usage information in usage collector 104 substantially simultaneously with the operation of the first usage processor 106. The second usage processor 108 produces a second, reduced data set for a second usage-based function 112. In this manner, usage monitor 100 provides first and second usage-based functions 110 and 112 with separate sets of data to implement their respective functions starting with the same data but applying separate processes.

Figure 2:
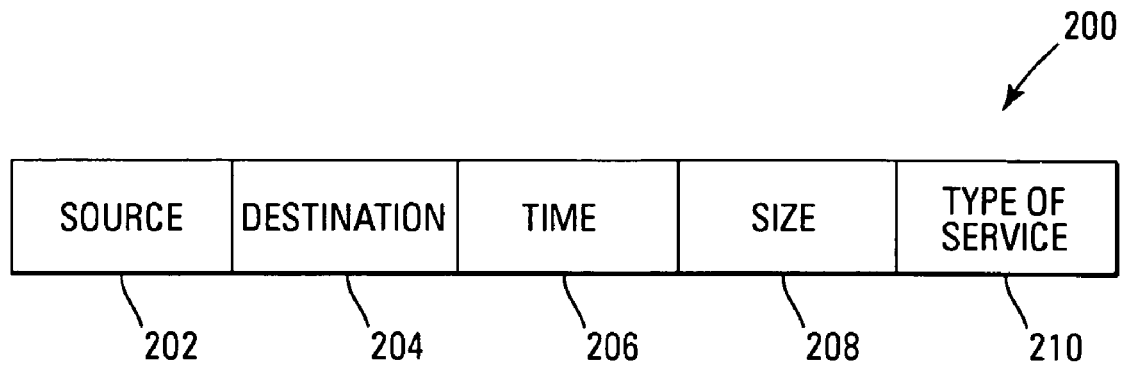
FIG. 2 is a diagram of one embodiment of a usage record for use in monitoring the usage of a network.

FIG. 2 is a diagram of one embodiment of a usage record, indicated generally at 200, for use in monitoring the usage of a network. Usage record 200, in one embodiment, comprises the usage messages provided by network 102 of FIG. 1 and collected in usage collector 104. In this example, the message or usage record 200 includes a number of fields that contain various statistics about a particular flow, e.g., source address 202, destination address 204, time 206, size 208, and type of service 210. In one embodiment, the source address 202 and destination address 204 fields contain addresses, e.g., IP addresses, Media Access Control (MAC) addresses, or other appropriate addresses, for the source and destination endpoints of a traffic flow. In one embodiment, the time field 206 contains information on the duration of a flow, e.g., the start time, the end time or the total duration of the flow. In one embodiment, the size field 208 contains an indication of the quantity of data, e.g., the number of packets, number of bytes, etc. in a particular flow. In one embodiment, the type of service field 210 contains an indication of the type of service provided for the flow, e.g., constant bit rate. In other embodiments, the usage records are supplemented with other information to provide usage functions 110 and 112 with information on these and other specific aspects of the usage of network 102. In one embodiment, the usage message is transmitted to the usage monitor 100 as a User Datagram Protocol (UDP) message.

Figure 3:
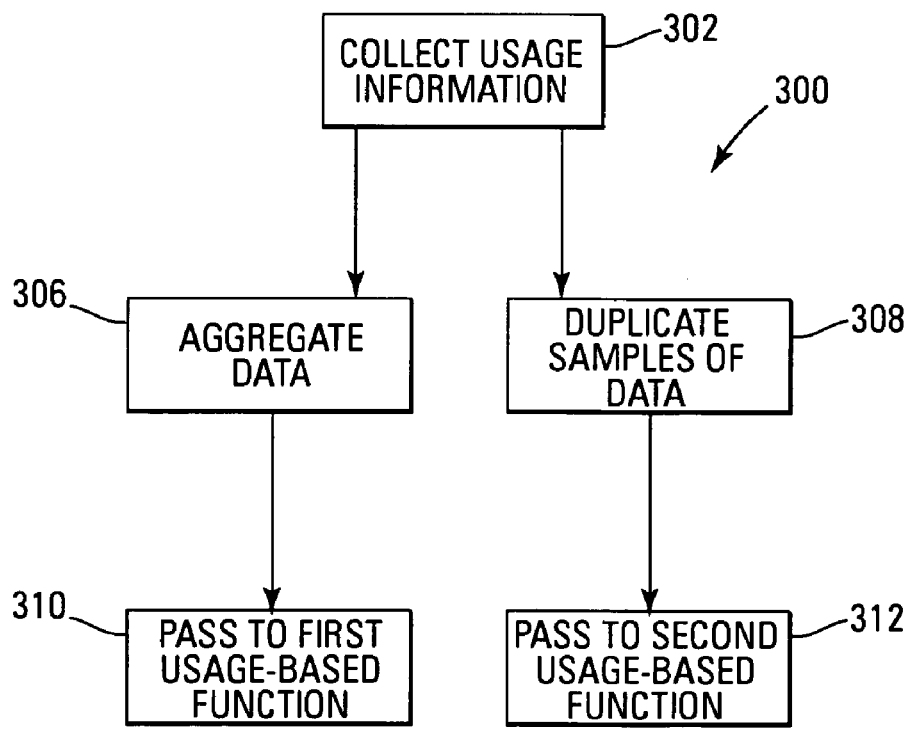
FIG. 3 is a flow chart of one embodiment of a process for monitoring the usage in a network.

FIG. 3 is a flow chart of one embodiment of a process, indicated generally at 300, for monitoring the usage in a network. The process begins at block 302 with the collection of usage information. In one embodiment, the process collects the usage information from messages or usage records from the network. In one embodiment, the usage records comprise messages from network elements in the network such as routers and the like. In one embodiment, the usage records comprise messages from routers that contain information regarding each flow of data through the network.

The usage information is processed substantially simultaneously for two types of usage-based functions at blocks 306 and 308, respectively. At block 306, a first process is performed on the usage information. In one embodiment, this first process aggregates data from the usage information to produce a first set of data. At block 310, the first set of data is passed to a first type of usage-based function, e.g., a usage-based billing function, for further processing. At block 308, the usage information is processed for use in another type of usage-based function. In one embodiment, the process retains samples of the usage information to produce a second, reduced set of data. At block 312, the reduced set of data is passed to a second usage-based function, e.g., a network analysis function, for further processing.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

What is claimed is:

1. A method for monitoring a network, the method comprising:
   collecting data containing information on usage of a network by subscribers, wherein collecting data includes collecting a message having a size field that indicates a total number of data packets in a data flow;
   aggregating the data for a first type of usage-based function; and
   simultaneously with the aggregating of the data, sampling the data for a second, different type of usage-based function.

2. The method of claim 1, wherein aggregating the data for a first type of usage-based function comprises aggregating the data for a billing function.

3. The method of claim 1, wherein sampling the data for a second, different type of usage-based function comprises sampling the data for a network analysis function.

4. The method of claim 1, wherein collecting the data comprises receiving usage data from at least one network element.

5. The method of claim 1, wherein collecting the data comprises receiving usage data from at least one router.

6. A method for monitoring a network, the method comprising:
   collecting data from a network element of the network, the data containing records of subscriber usage of the network, wherein collecting data includes collecting a message having a size field that indicates a total number of data packets in a data flow;
   in a first usage processor, aggregating the collected data to form a first set of data for use in a billing system;
   in a second processor, selecting samples of the collected data to retain to form a reduced set of data for use in a network analyzer system; and
   wherein the second processor selects the samples of the collected data simultaneously with the first processor aggregating the collected data.

7. The method of claim 6, wherein collecting data comprises receiving usage statistics from at least one router in the network in a User Datagram Protocol (UDP) message.

8. A usage monitoring system, the system comprising:
   a usage collector that collects usage records from a network, wherein the usage records collection includes a collection of a message having a size field that indicates a total number of data packets in a data flow;
   a first usage processor, responsive to the usage collector, that aggregates the collected usage records to form a first set of data for a first type of usage-based function; and
   a second usage processor, responsive to the usage collector, that samples the usage records simultaneously with the first usage processor to form a second, reduced set of data for a second type of usage-based function.

9. The system of claim 8, wherein the usage collector is adapted to receive records of use of the network by subscribers from at least one router in the network.

10. The system of claim 8, wherein the first type of usage-based function is a network analyzer function.

11. The system of claim 8, wherein the second type of usage-based function is a billing function.

12. A system for monitoring usage of a network, the system comprising:
   a first usage processor that aggregates data in records of usage of a network by subscribers for a first type of usage-based function, wherein the data aggregation includes a collection of a message having a size field that indicates a total number of data packets in a data flow;
   a second usage processor that selects samples of the records for a second type of usage-based function; and
   wherein the first usage processor aggregates the data simultaneously with the second usage processor selecting samples of the records.

13. The system of claim 12, wherein the first usage processor aggregates the data for a billing function.

14. The system of claim 12, wherein the second usage processor samples the data for a network analyzer function.

15. A machine-readable medium having instructions stored thereon for performing a method, the method comprising:
   receiving records containing data of usage of a network by subscribers, wherein receiving records includes collecting a message having a size field that indicates a total number of data packets in a data flow;
   aggregating data from the records to create a set of data for use in a billing system; and
   simultaneously with the aggregating of the data, selecting samples of the records to create a second, reduced set of data for use in a network analyzer system.

16. The machine-readable medium of claim 15, wherein receiving records comprises receiving records of usage of the network from at least one network element.

17. The machine-readable medium of claim 15, wherein receiving records comprises receiving records of the usage of the network from at least one router in the network.

* * * * *